United States Patent
Goosen et al.

(10) Patent No.: US 11,093,302 B2
(45) Date of Patent: Aug. 17, 2021

(54) USER-CUSTOMIZABLE APPLICATION PROGRAMMING INTERFACES IN A PROVIDER NETWORK

(71) Applicant: Amazon Technologies, Inc., Seattle, WA (US)

(72) Inventors: Christopher Sam Goosen, Seattle, WA (US); Diwakar Gupta, Seattle, WA (US); Jacob Adam Gabrielson, Seattle, WA (US); Marcin Piotr Kowalski, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/580,265

(22) Filed: Sep. 24, 2019

(65) Prior Publication Data
US 2021/0089368 A1 Mar. 25, 2021

(51) Int. Cl.
| | |
|---|---|
| *G06F 9/44* | (2018.01) |
| *G06F 9/54* | (2006.01) |
| *G06F 9/48* | (2006.01) |
| *H04L 12/24* | (2006.01) |
| *H04L 29/08* | (2006.01) |
| *G06F 3/0482* | (2013.01) |

(52) U.S. Cl.
CPC ............ *G06F 9/541* (2013.01); *G06F 9/4881* (2013.01); *G06F 9/54* (2013.01); *H04L 41/046* (2013.01); *H04L 41/20* (2013.01); *H04L 67/36* (2013.01); *G06F 3/0482* (2013.01)

(58) Field of Classification Search
CPC ...................................................... G06F 9/541
USPC ......................................................... 719/318
See application file for complete search history.

(56) References Cited

U.S. PATENT DOCUMENTS

| | | | |
|---|---|---|---|
| 10,218,776 B2* | 2/2019 | Llorca ....................... G06F 9/50 |
| 2012/0203888 A1* | 8/2012 | Balakrishnan .......... G06F 9/505 |
| | | | 709/224 |

(Continued)

FOREIGN PATENT DOCUMENTS

| | | |
|---|---|---|
| WO | 2014/007811 A1 | 1/2014 |
| WO | 2014/021849 A1 | 2/2014 |

OTHER PUBLICATIONS

Unpublished U.S. Patent Application for "Request Authorization Using Recipe-Based Service Coordination", U.S. Appl. No. 15/629,559, filed Jun. 21, 2017, 44 pages.

(Continued)

*Primary Examiner* — Timothy A Mudrick
(74) *Attorney, Agent, or Firm* — Nicholson De Vos Webster & Elliott LLP

(57) ABSTRACT

Techniques are described for enabling customers of a service provider network to modify and extend the functionality of application programming interfaces (APIs) provided to customers by various services of the provider network. Services of a service provider network provide interfaces that enable customers and other users to define custom API actions representing functionality to be performed by the services upon receipt of corresponding API requests. In this manner, the functionality exposed by provider network services to customers via APIs becomes extensible and customizable to fit customers' particular use cases and without the provider network needing to contemplate and explicitly implement all possible customer-specific API action variations.

20 Claims, 8 Drawing Sheets

(56) References Cited

U.S. PATENT DOCUMENTS

| | | |
|---|---|---|
| 2013/0232498 A1 | 9/2013 | Mangtani et al. |
| 2016/0077897 A1* | 3/2016 | Tsang ..................... G06F 9/547 |
| | | 719/328 |
| 2017/0068646 A1* | 3/2017 | Beechuk ................. H04L 67/10 |
| 2017/0366416 A1* | 12/2017 | Beecham ................ H04L 45/50 |

OTHER PUBLICATIONS

International Search Report and Written Opinion, PCT/US2020/045572, dated Oct. 23, 2020, 15 pages.

\* cited by examiner

USER-CUSTOMIZABLE APPLICATION PROGRAMMING INTERFACES IN A PROVIDER NETWORK

BACKGROUND

Cloud computing service providers enable users to use a variety of computing-related resources, often on a metered pay-as-you-go basis, without direct active management by the users of the underlying hardware and software used to support the basic operation of the resources. Examples of such resources include compute resources, data/storage resources, network-related resources, application resources, routers and other data processing resources, and the like. These resources are often provided via various web services, such as a hardware virtualization service that allows users to use virtual computers on which to run applications, a storage service that allows users to store data objects, and so forth.

Users typically interact with the services provided by a service provider network across intermediate networks including, for example, the internet. Often this interaction takes place using various defined interfaces such as application programming interface (API) calls specified by the various services or via a console implemented as a website or application. These interfaces may be part of, or serve as a front end to, a control plane of the service provider network that includes back end services supporting and enabling the services offered to users.

BRIEF DESCRIPTION OF DRAWINGS

Various embodiments in accordance with the present disclosure will be described with reference to the drawings, in which.

DETAILED DESCRIPTION

Figure 1:
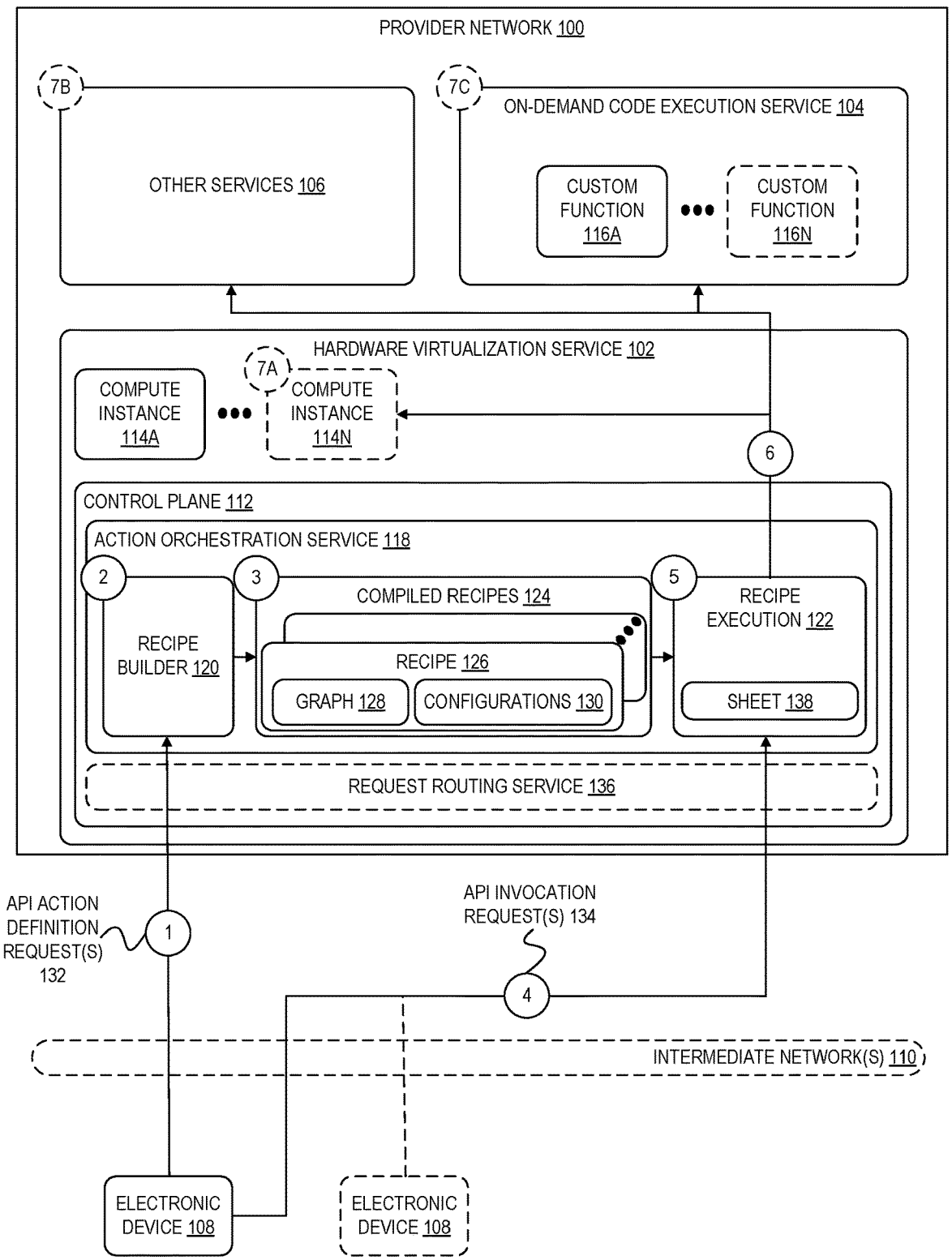
FIG. 1 is a diagram illustrating an environment that enables customers of a service provider network to create and modify custom application programming interface (API) actions according to some embodiments.

The present disclosure relates to methods, apparatus, systems, and non-transitory computer-readable storage media for enabling customers of a service provider network to modify and extend the functionality of application programming interfaces (APIs) provided to customers by various services of the provider network. According to embodiments described herein, services of a service provider network provide interfaces that enable customers and other users to define custom API actions representing functionality to be performed by the services upon receipt of corresponding API requests. For example, consider a service that provides an API including a set of API actions used by customers of the service to perform various actions related to virtual computing resources such as, for example, launching new virtual machine (VM) instances, creating VM placement groups, and the like. In some embodiments, customers of the provider network can view collections of "agents" that are used by the service to implement the functionality associated with some or all of such API actions. Those customers can further modify the set of agents associated with particular API actions, for example, to remove agents that are irrelevant to particular customers' use cases, to add agents representing additional functionality desired by a customer, to create entirely new API actions based on selected sets of agents, or various combinations thereof. In this manner, the functionality exposed by provider network services to customers via APIs becomes extensible and customizable to fit customers' particular use cases and without the provider network needing to contemplate and explicitly implement all possible customer-specific API action variations.

As indicated above, the services provided by a provider network are commonly accessed by customers of the service provider via APIs. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. For example, consider again a hardware virtualization service that enables users to obtain virtual computing capacity from the service provider. An example API for this service might include a "run instances" API action used by customers of the service to launch new compute instances, a "describe instances" API action used to obtain information about one or more running instances, among many other possible API actions. If a customer or other user of the provider network desires to create a new VM instance, the user can cause the generation of a "run instances" API request (for example, using a graphical user interface (GUI) console or other interface) along with various request parameters to instruct the service to create one or more new instances. This type of API request can be associated with any number of input parameters depending on various options and features supported by the API action. The "run instances" API action, for example, might include parameters used to specify a type of instance to be created, one or more types of storage to be used by the instance, network settings to be applied to the instance, and so forth.

For some API actions, a service may add or modify the options and features associated an API action over time. Referring again to the example of a "run instances" API action, developers associated with the hardware virtualization service may add over time the ability to attach new types of interfaces or devices when launching new instances (for example, to attach one or more new types of virtual network interfaces, graphics processing units (GPUs), and so forth), to attach new types of storage volumes, to support additional types of networking functionality, and the like, as such functionality becomes available. Many API actions thus represent ever-evolving collections of features and functionalities under ongoing development by service provider developer teams, only a portion of which functionality may be relevant to any given individual customer and which may still be lacking in features desired by yet other customers.

In some embodiments, to help internal development teams manage some of the complexity involved in developing and supporting the operation of increasingly complex API actions, an action orchestration service can be used. At a high level, the use of an action orchestration service to manage API action development and operation involves the decomposition of API actions into a set of interrelated functions, or "agents," the execution of which can be orchestrated by the action orchestration service upon request. In some embodiments, each of the constituent agents implementing an API action represents a call to functionality implemented by the service to which the action relates, implemented by other services of the provider network, or implemented at any other location accessible to the service. The sum of the functionality provided by the individual agents collectively implements the associated action and its associated features. In some embodiments, the set of agents representing an API action, and data dependency relationships among such agents, can be represented by a directed acyclic graph, as described in more detail herein. The modular decomposition of API actions in this manner has enabled internal development teams to more readily modify and extend the functionality of API actions over time in response to customer feature requests or other desired development goals. At the same time, external customers are still largely dependent upon the API action implementations exposed to them and to the functionality that internal development teams have been able to implement and support.

According to embodiments described herein, to enable customers of a provider network greater control over the operation and functionality of the API actions associated with provider network services, a provider network enables customers to view and modify API action implementations, to create entirely new custom API actions, to create custom agents that can be used as part of API action implementations, among other options for customizing and extending the functionality of a provider network API. A custom API action defined by a customer of a provider network, comprising a user-selected set of agents and dependency definitions, is then compiled into an action "recipe" that can be executed upon request by the service (for example, in response to customer-initiated API requests to invoke the custom API action). In some embodiments, a provider network provides graphical user interfaces (GUIs) that display a visual representation of API action recipes and that further enable users to modify or otherwise specify custom API actions. By enabling external customers greater control and flexibility with respect to use of provider network service APIs, customers are no longer constrained by the exact feature set currently supported by service and can tailor an API for the customer's particular use cases. Furthermore, allowing the creation of custom API actions enables a provider network to increase the efficiency with which API actions are executed by streamlining the functionality of the actions to better match customer needs, and alleviates the need for internal developers to contemplate and implement all possible types of API actions desired by customers, among other benefits.

FIG. 1 is a diagram illustrating an environment for enabling external customers of a service provider network to create and modify custom API actions provided by various services of a provider network according to some embodiments. In some embodiments, a hardware virtualization service 102, an on-demand code execution service 104, and other services 106, among any number of other possible services, operate as part of a service provider network 100. Each service comprises one or more software modules executed by one or more electronic devices at one or more data centers and geographic locations. User(s) using one or more electronic device(s) 108 (which may be part of or separate from the service provider network 100) can interact with the various services of the service provider network 100 via one or more networks 110, such as the internet. Although embodiments described herein refer to the ability for external "customers" of a provider network to customize provider network APIs, in general, the techniques described herein can be used by any user desiring to modify or extend the operation of one or more actions associated with an API of a provider network 100.

A provider network 100 (or "cloud" provider network) provides users with the ability to utilize one or more of a variety of types of computing-related resources such as compute resources (for example, executing virtual machine (VM) instances and/or containers, executing batch jobs, executing code without provisioning servers), data/storage resources (for example, object storage, block-level storage, data archival storage, databases and database tables, and the like), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, and so forth. These and other computing resources may be provided as services, such as a hardware virtualization service 102 that can execute compute instances 114, a storage service that can store data objects, etc. The users (or "customers") of provider networks 100 may use one or more user accounts that are associated with a customer account, although these terms may be used somewhat interchangeably depending upon the context of use. Users may interact with a provider network 100 across one or more intermediate networks 110 (for example, the internet) via one or more interfaces, such as through use of application programming interface (API) calls, via a console implemented as a website or application, etc. The interfaces may be part of, or serve as a front-end to, a control plane of the provider network 100 that includes "backend" services supporting and enabling the services that may be more directly offered to customers (including, for example, a control plane 112 associated with the example hardware virtualization service 102 in FIG. 1).

In some examples, a provider network 100 may be referred to as a "cloud" provider network. A cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network 110 (for example, the internet or a cellular communication network) and the hardware and software in cloud provider data centers that provide those services.

A cloud provider network can be formed as a number of regions, where a region may be a geographical area in which the cloud provider clusters data centers. Each region can include multiple (that is, two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region are positioned far enough away from one other that a same natural disaster (or other failure-inducing event) should not affect or take more than one AZ offline at the same time.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance 114 (for example, provided by a hardware virtualization service 102) hosted by the provider network to perform a variety of computing tasks. Additionally, or alternatively, a user may indirectly utilize a compute instance by submitting code to be executed by the provider network (for example, via an on-demand code execution service 104), which in turn utilizes a compute instance to execute the code—typically without the user having any control of or knowledge of the underlying compute instance(s) involved.

For example, in various embodiments, a "serverless" function (such as custom functions 116A-116N) may include code provided by a user or other entity—such as the provider network itself—that can be executed on demand. Serverless functions may be maintained within provider network 100 by an on-demand code execution service 104 and may be associated with a particular user or account or be generally accessible to multiple users/accounts. A serverless function may be associated with a Uniform Resource Locator (URL), Uniform Resource Identifier (URI), or other reference, which may be used to invoke execution of the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (for example, having a pre-initialized runtime environment configured to execute the serverless functions), allowing the serverless functions to be executed in near real-time.

As indicated above, the services of a provider network may include a control plane (for example, the control plane 112 associated with the example hardware virtualization service 102 in FIG. 1) that enables configuration and management of service resources. Users may typically interact with the services via an API, which may be implemented as part of the control plane 112, by invoking the execution of various API actions supported by the service. In some embodiments, the operation of an API is aided by an action orchestration service 118 that executes action "recipes" corresponding to some or all of the supported API actions, where a recipe generally defines a set of functions to be performed to carry out the requested API action. In some embodiments, an action orchestration service 118 includes a recipe builder 120, used to build and maintain compiled action recipes 126, and a recipe execution 122 component, used to process requests for actions corresponding to a compiled recipe 124, as described in more detail elsewhere herein.

In some embodiments, a recipe 126 generally comprises a data structure used to carry out a corresponding action by invoking a set of functions, or agents, each representing constituent functionality of the action. For example, a "run instances" API action of a hardware virtualization service 102 might be implemented by a set of agents including an agent that receives user input, an agent that validates the request parameters, an agent that validates a customer's account limits, an agent that locates a physical server to run the instance, an agent that starts the instance on the server, and so forth. To build a recipe for an action, a user submits an input recipe to the recipe builder 120. The recipe builder 120 analyzes the input recipe, compiles the input recipe into a compiled recipe 126, and stores the compiled recipe in a repository of compiled recipes 124. Using a computing device, a developer may enter suitable input using an interface to the recipe builder 120 to provide an input recipe or use a separate application to generate an input recipe (for example, as a file written in a structured language used to define recipes), as described in more detail herein. The interface may include a graphical user interface (GUI), command-line interface (CLI), voice-enabled interface, touch-enabled interface, programmatic interface (for example, an API), or any other suitable interface.

In some embodiments, a compiled recipe 126 is comprised of at least two components: a directed acyclic graph 128 and a set of configurations 130. The directed acyclic graph 128 represents the set of functions or service calls to be invoked by the action orchestration service 118 and data dependencies among the functions, while the configurations 130 represent options associated with one or more of the nodes and edges of the directed acyclic graph (that is, nodes and edges representing agents and associated dependencies). The options generally can include instructions and metadata for invoking each of the agents such as, for example, identification of endpoints at which to invoke a function associated with an agent, how many connections to open with the endpoint, security parameters (for example, Secure Sockets Layer (SSL) information, authorization information, certificates, and the like), whether to perform client-side load balancing, timeout settings, whether to retry and with what retry strategy, and so forth. In some embodiments, the configuration is specified in an eXtensible Markup Language (XML) file or other type of structured data file. In some embodiments, an identifier for a compiled recipe 126 is generated as a secure hash of both the graph 128 and the associated set of configurations 130, and a compiled recipe can be further associated with an API action name or alias specified by a user creating the API action.

In some embodiments, the recipe builder 120 supports changes to compiled recipes 124. Changes submitted by a user for an existing recipe, for example, may include new or different agents, new or different inputs or outputs associated with one or more agents, new configuration parameters, and so forth. In one embodiment, any such change may result in recompilation of the associated recipe. In some embodiments, a recipe may be automatically updated when any of its underlying service operations are changed. For example, the recipe builder 120 may identify changes to one or more underlying service operations, determine the compiled recipes that are potentially affected by the changes, and recompile the recipes to account for the changes in the service operations.

In some embodiments, each of the nodes of a recipe graph represents either an agent or a field. A field represents a data item either produced by an agent or otherwise statically defined as part of the recipe. In the context of the recipe graph, a field is generally immutable and is associated with a name and a data type. An agent represents an executable function that can be applied to data and is typically implemented by a remote service call; however, some agents can also be executed directly by the action orchestration service 118 (for example, to perform protocol translation or other helper operations). An agent may depend on one or more fields, where such dependencies are represented as an edge in the directed acyclic graph, and further generate one or more additional fields, where the graph includes an edge between an agent and its output fields. The edges between nodes in a recipe graph generally connect nodes of differing types (for example, generally a field node cannot have an edge to another field node and likewise for agent nodes, although there may be some exceptions to this rule).

In some embodiments, an agent included in a recipe graph is associated with defined input and output types. The associated input and output types are used by the action orchestration service 118 to determine when the service can execute a given agent. For example, the action orchestration service 118 generally executes agents in a graph when the service determines that any required input values associated with an agent have been generated by preceding nodes in the graph or are otherwise available. In some embodiments, the action orchestration service 118 ignores data produced by an agent that is not specified as an output type as part of the recipe graph, and otherwise stores the fields produced by the agents of a graph and uses those fields to construct requests to other agents in the recipe graph.

In some embodiments, an action orchestration service 118 supports at least two types of input fields for an agent in a recipe: optional and required. In this example, the action orchestration service 118 may execute agents that include one or more optional input fields even if one or more optional input fields were not generated by an upstream agent, assuming that all required fields are available. As described above, the action orchestration service 118 executes an agent in a recipe graph whenever all the required input fields of the agent have been generated or can never be generated.

Generally, a recipe graph includes at least one agent with no associated input fields, which is used to start execution of a recipe graph. In some examples, an initial agent may represent a "customer request" agent that generates output corresponding to a customer request that initiated execution of the action recipe. For example, if execution of an action recipe is invoked in response to receipt of an API request from a customer, a "customer request" agent included as part of the recipe graph may execute first and generate output fields including data from the API request (for example, including various request parameters and other data) which are used by one or more downstream agents to perform further operations. In some embodiments, the agents of an action recipe can be executed in parallel and are generally invoked as soon as any required input fields associated with the agent are available. In some embodiments, an action orchestration service 118 executes the agents of an action recipe either until all agents in the recipe have been executed or until one or more agents can never be invoked (for example, because one or more required fields associated with the uninvoked agent(s) were not generated by preceding agents in the recipe graph).

Figure 2:
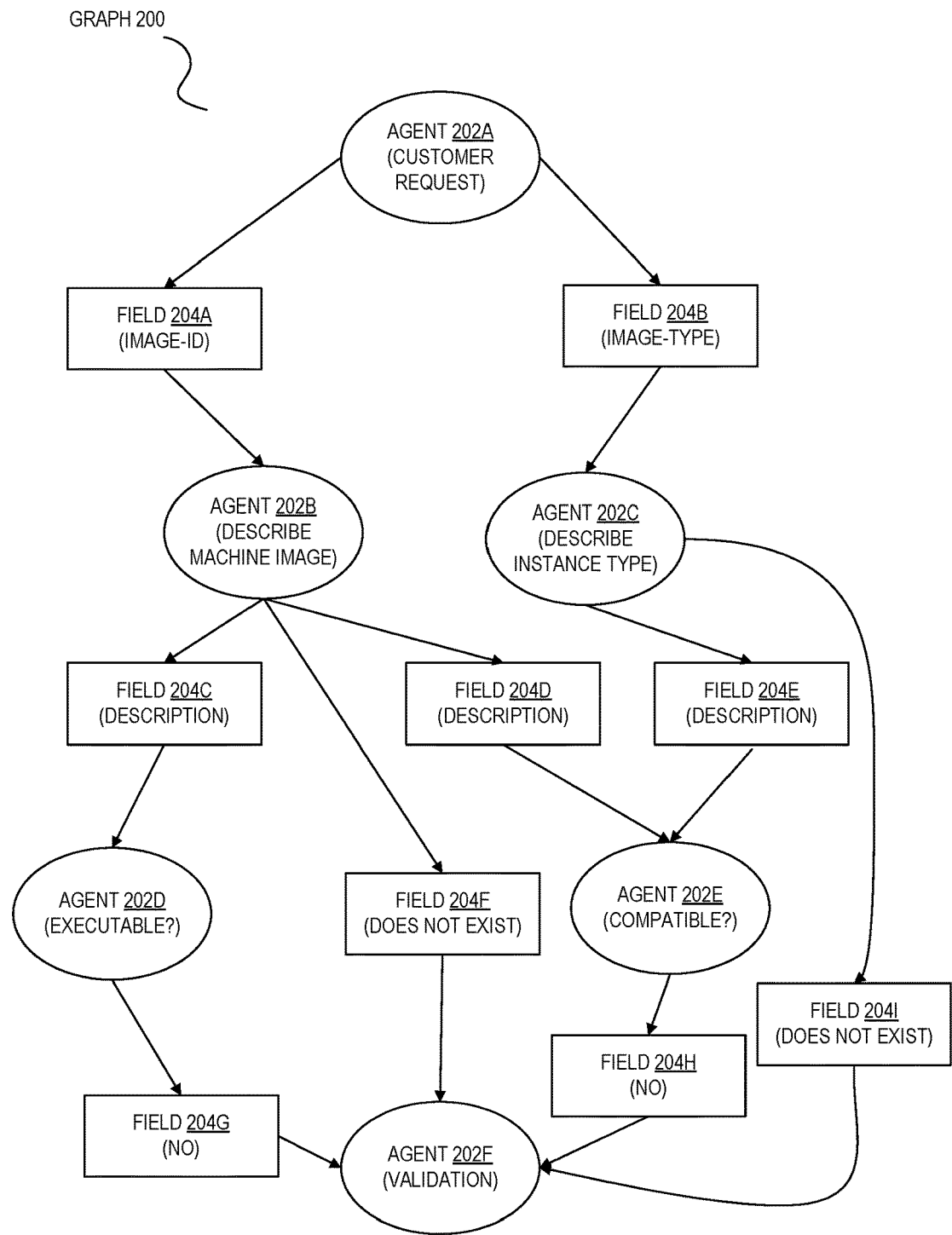
FIG. 2 illustrates an example of a directed acyclic graph representing an API action recipe according to some embodiments.

FIG. 2 illustrates an example of a directed acyclic graph resulting from the compilation of an input recipe according to some embodiments. The ovals in the example graph 200 represent nodes that correspond to agents and associated service operations and the rectangles represent data fields resulting from execution of agents. As described above, the agents may be indicated in the input recipe and the flow of data from agent to agent may be determined based at least in part on automated analysis of the associated input and output fields. In some embodiments, an order of execution of the agents may not be indicated in the input recipe and the agents may be automatically arranged by the recipe builder 120 in the various paths as shown in the example graph 200. For example, the recipe builder 120 may automatically determine that two operations are connected in the graph if one operation produces a particular field as an output and another operation consumes that same field as an input. The flow of data in the graph 200 may represent one or more potential execution orders; an actual execution order may be determined for a particular request at runtime. In some embodiments, a developer of the corresponding recipe may specify manual overrides to the bindings among the agents based on field relationships.

The field nodes in the example graph 200 (for example, fields 204A-204H) may correspond to the fields in a sheet corresponding the request. In the example graph 200, the top-level node 202A represents an incoming customer request, such as a request for an operation to describe a machine image type. The node 202A may provide the fields image-id 204A and instance-type 204B to other agents that are invoked by the action orchestration service 118. The agent 202B used to describe a machine image may take the image-id field 204A as input. The agent 202C used to describe an instance type may take the instance-type field 204B as input. The describe machine image agent 202B may produce a description field 204C as input to an agent 202D that determines whether the machine image is executable. The describe machine image agent 202B may also provide the description field 204D as input to an agent 202E that determines whether the machine image is compatible. The describe instance type agent 202C produces its own description field 204E as input to the agent 202E that determines whether the machine image is compatible. If the machine image does not exist, the agent 202B provides such an indication 204F to a validation agent 202F. Similarly, if the instance type does not exist, the agent 202C provides such an indication 204I to the validation agent 202F. If the machine image is not executable, then the agent 202D provides such an indication 204G to the validation agent 202F. If the machine image or instance type is not compatible, then the agent 202E may provide such an indication 204H to the validation agent 202F.

Accordingly, in the example graph 200, the agent 202E may take input fields from two upstream service agents 202B and 202C. From request to request, the agents 202B and 202C may vary in terms of how long they take to complete and when they produce their respective output fields. As indicated above, the order in which nodes of the graph 200 are traversed may vary from request to request, and the execution order may be determined at runtime based on the graph itself but also based on the order in which fields become available. For example, in some cases the agent 202D may be invoked while the agent 202E remains waiting for the description 204E produced by the agent 202C. In other cases, when the description 204E is ready before the description 204C, the agent 202E may be invoked before or around the same time as the agent 202D. Different paths in the graph 200 may also be traversed in parallel. By traversing the graph 200 based at least in part on which inputs are available, the action orchestration service 118 may provide both speed and flexibility for orchestrating existing service operations into a collaborative operation implementing an API action.

According to embodiments described herein, the ability to manage and customize the operation of API actions as described above is exposed to customers and other users external to a provider network. The numbered circles labeled "1" through "7" in FIG. 1 illustrate an example process involving an external customer of a service provider network defining an API action recipe and invoking execution of a custom API action according to some embodiments. In some embodiments, at the circle labeled "1" in FIG. 1, a customer or other user of the provider network 100 generates one or more API action definition requests 132, where the request(s) originate from a computing device 108 external to the provider network 100. As described above, the implementation of an API action can be represented as a set of agents and data dependencies among the API actions that is compiled into an action recipe associated with a directed acyclic graph and associated configurations. In some embodiments, the API action definition requests 132 received from a user generally can include requests to modify a recipe associated with an existing API action (for example, to remove agents, add additional agents, or modify configurations associated with one or more agents) or requests to create a new API action comprising a selected set of agents and defined data dependencies. As described herein, the API action definition request(s) 132 can be provided via various interfaces such as API calls, via a console implemented as a website or application, and so forth.

In some embodiments, in order to assist users with the creation of custom API actions, a service such as hardware virtualization service 102 may enable users to view a list of agents associated with one or more existing API actions. For example, if developers associated with the provider network 100 desire for users to be able to modify the set of agents associated with a recipe that is used to implement a "run instances" API action of the service 102, the external users may be able to view the set of agents or a selected subset thereof in a recipe builder interface. In some embodiments, the set of agents comprising a customizable API action may include one or more non-optional agents to which modification is not permitted, and such non-optional agents may be hidden from users' view or displayed in a manner indicating the non-optional nature of those agents as part of the associated recipe. In this example, a visual or other representation of an API action may display a simplified structured, where some of the externally displayed agents may represent be implemented as a group of agents internally. In some embodiments, the modification of an API action recipe can include adding agents that are part of other API action recipes or are associated with other services of the provider network 100. Referring again to the example of a user modifying a "run instances" API action of a hardware virtualization service 102, the user can modify the associated recipe to include agents used by other API actions supported by the hardware virtualization service 102, or agents associated with a separate service (for example, an auto scaling service or storage service).

Figure 3:
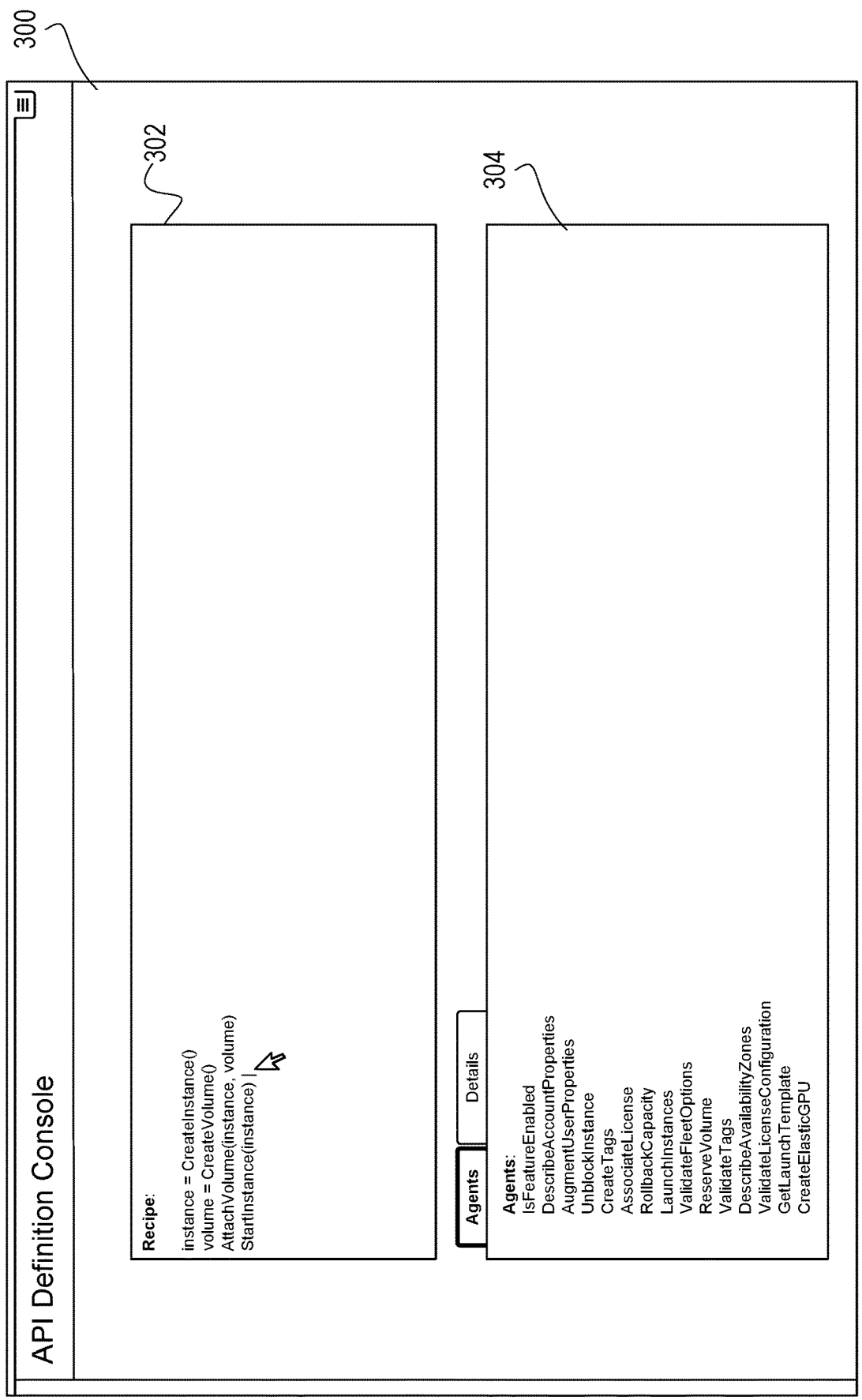
FIG. 3 illustrates an example of a graphical user interface (GUI) used to display a set of possible agents that can be used as part of defining a custom API action recipe according to some embodiments.

FIG. 3 illustrates an example of a GUI used to display a set of possible agents that can be used as part of defining a custom API action recipe according to some embodiments. As shown, an API definition console 300 includes a recipe definition panel 302 and an agent information panel 304. In some embodiments, the recipe definition panel 302 enables users to specify an API action recipe using a recipe definition language. In this example, a recipe definition language allows users to specify a set of agents to be included as part of a recipe and to further specify data dependencies among the agents. As shown in the example of FIG. 3, a user has created a simple recipe including a "CreateInstance" agent that generates an "instance" field and a "CreateVolume" agent that generates a "volume" field. The fields generated by the "CreateInstance" and "CreateVolume" agents are used as input to an "AttachVolume" and "StartInstance" agent. In some embodiments, users may use other types of recipe definition languages, such as the example snippet below showing a simple list of agents that can be compiled into a recipe graph:

```
...
1 # During compilation, the inputs and outputs of the following agents are matched up
2 # to generate an execution graph which instructions the action orchestration service
3 # what to call to fulfill the API request.
4
```

```
5 agents:
6-CreateInstance
7-CreateVolume
8-AttachVolume
9-StartInstance
. . .
```

In the example above, users may also be able to optionally specify data dependencies among the agents as a hint to the recipe builder when compiling the recipe. A user can create a recipe using the recipe definition panel 302 starting from "scratch" or by modifying an existing recipe definition. For example, a user can select an existing recipe and the recipe definition language commands associated with the recipe can be displayed in the recipe definition panel, which the user can modify as desired.

In some embodiments, an agent information panel 304 displays a list or other representation of agents that can be used by the user to create recipes using the recipe definition panel 302 or other interface. As indicated above, the possible agents can include agents associated with a service to which the recipe under development relates, agents associated with other services of the provider network 100, and custom agents created by the user or other users. In some embodiments, the custom agents and recipes can be included as part of a searchable public listing service provided by the provider network 100. The public listing service, for example, may represent a "marketplace" of custom agents and recipes that enable customers to share custom agents and recipes that the customers create with other customers of the service provider network. In some embodiments, agents and recipes added to the public listing service may be associated with text descriptions or tags that help other users find agents/recipes for their particular use cases.

Figure 4:
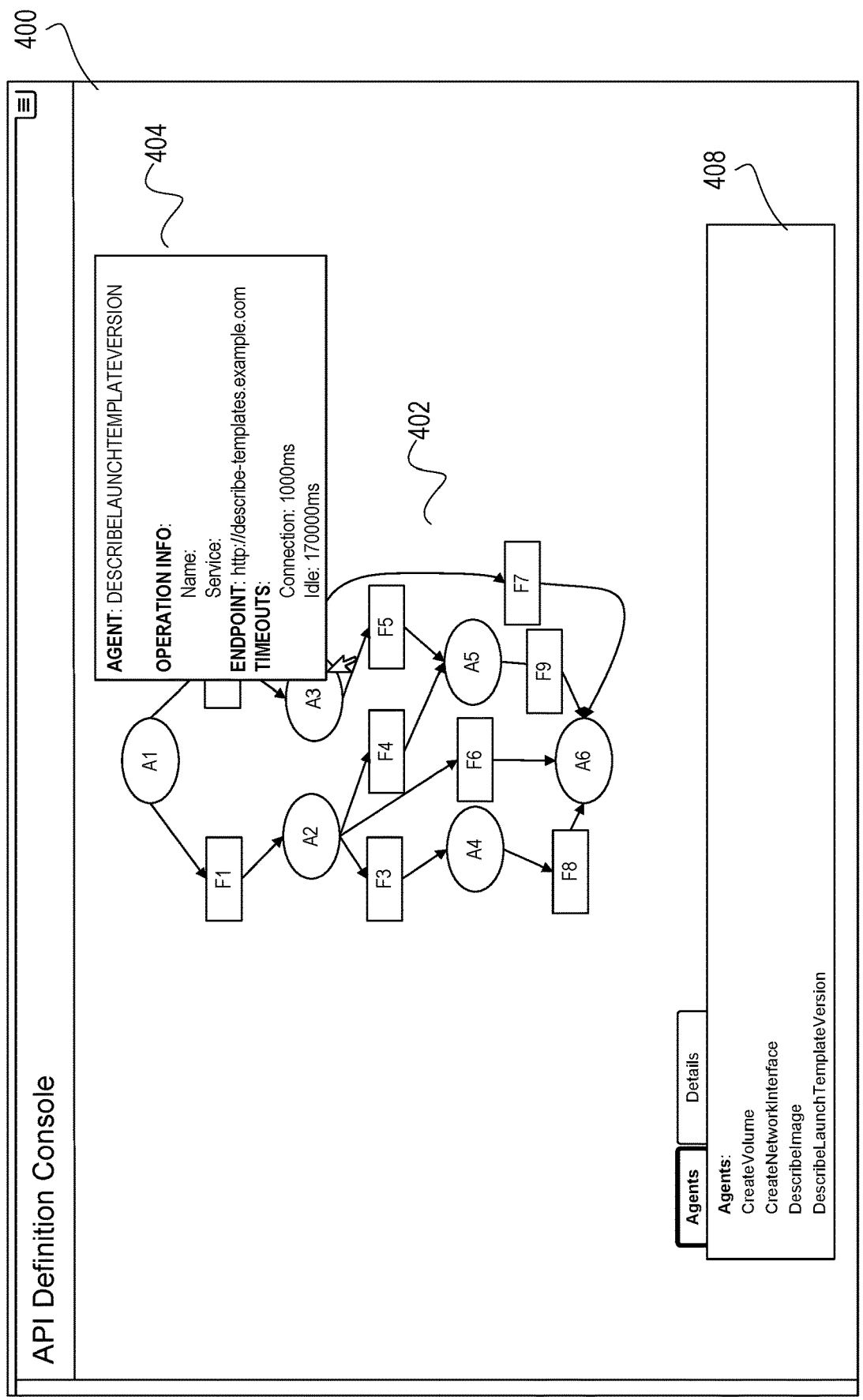
FIG. 4 illustrates an example of a GUI including a visual API action recipe definition interface element according to some embodiments.

In some embodiments, users can modify an API action recipe using a GUI that displays a graphical representation of an associated recipe graph. FIG. 4 illustrates an example of a GUI including a visual API action recipe definition interface element according some embodiments. As shown, an API definition console 400 includes the display of a recipe graph 402 and an agent information panel 408. The recipe graph 402, for example, displays a set of nodes and edges representing the agents and data dependencies of a recipe, which the user can modify using the interface. For example, a user can add additional agents to the graph, remove existing agents in the graph, specify nodes that are connected by edges, and modify configurations associated with various agents and fields by interacting with the elements of the displayed graph. As illustrated by the node information panel 404, which may be displayed when a user hovers their cursor over or otherwise selects an element of the graph, additional information about the graph elements can be displayed to the user and modified as desired. In some embodiments, modifications to a recipe graph 402 result in recompilation of the recipe into an updated compiled recipe.

As an example of a type of modification that a user might make to an API action recipe, using any of the various interfaces described above or others, consider a "describe instances" API action that typically returns all available information and parameters related to one or more identified compute instances managed by a hardware virtualization service 102. In this example, a user associated with compute instances having relatively simple configurations might be interested in only a small subset of the information returned by the standard "describe instances" API action. Thus, the user might customize the recipe associated with the "describe resource" API action so that the only information relevant is returned to the user when invoked. As yet another example, a user might modify an API action recipe to enable launched compute instances to be associated with a new attachment type (for example, a new type of virtual graphics processing unit (vGPU)). In this example, the user can supplement the existing "run instances" API action recipe with an agent that attaches the new type of vGPU upon launch. In each of these examples, the users can associate a name with their custom API actions so that the actions can be invoked without any disruption or modification to the service-wide versions of the corresponding API actions.

In some embodiments, customers can create custom agents that can be included in a recipe. For example, a customer can use an on-demand code execution service 104 or other service to define an agent that can be accessed via a service call similar to the operation of other provider network-provided agents. These custom agents can then similarly be included in a recipe that is compiled into a graph that can be executed by the action orchestration service 118. As an example of a customer-created custom agent, consider a user that desires for certain actions to take place in response to execution of a "describe instances" API action indicating that an instance is unhealthy. In this example, the user can create one or more custom functions at an on-demand code execution service 104 that determine whether an instance is healthy based on field data returned by other agents of the "describe instances" recipe and to possibly perform various recovery actions, and the like.

At circle "2" in FIG. 1, a recipe builder 120 of the action orchestration service 118 compiles the recipe definition and, at circle "3," stores data representing the user's custom API action in the form a compiled recipe 126. As indicated above, in some embodiments, based on the input provided from the customer at circle "1" defining an action recipe, the recipe builder 120 compiles the information in the input recipe into a directed acyclic graph 128 of service operations linked by fields of data, where each field represents the output of one service operation and the input to another. The agents representing the service operations may be unordered in the input recipe, and in generating the compiled recipe 126, the recipe builder 120 determines an order of the flow of data between the service operations by analyzing the operations in the input recipe to determine the typed inputs and outputs and produces the directed acyclic graph 128 of data flow between operations.

In some embodiments, the recipe builder 120 implements a set of rules and validations intended, for example, to prevent loops forming in the graph. The recipe builder 120 may also implement a variety of other graph analysis rules to determine if other undesirable conditions are present and may fail the compilation process if so. Additionally, the recipe builder 120 may implement rules to determine best practices and may issue warnings if violations are detected. The resulting graph 128 may be automatically generated based at least in part on service definitions including input and output models for the various service operations and not necessarily using specific sequences or paths between service operations as specified by the customer providing the API action definition input. The service operations may be associated with typed input fields (that is, input data fields characterized by data types) and typed output fields (that is, output data fields characterized by data types), and the flow of data may be determined based at least in part on correspondences between the typed input fields and the typed output fields of the service operations. For example, the recipe builder 120 may automatically determine that two operations are connected in the graph if one operation produces a particular field having a particular data type as an output and another operation consumes that same field with the same data type as an input. As used herein, the term "automatically" indicates that a task can be performed to completion by an automated system without additional user input (after some initial configuration stage and/or instruction to begin). The compiled recipe 126 may be used to process requests, for example, requests from web clients for a customer-facing operation associated with the recipe, as described in more detail elsewhere herein.

Once a user has created a custom API action recipe, as described above, the user can invoke the API action by sending an API request identifying the name of the custom API action and providing any associated request parameters. Returning to FIG. 1, at circle "4," a user causes an electronic device 108 to send an API invocation request 134 to invoke a custom API action. In other examples, an API request can be generated programmatically. The API request can also originate from sources other than an external electronic device 108 including from any of the compute instances 114A-114N of the hardware virtualization service 102 or from other services 106 of the provider network 100. The custom API action may be termed a customer-facing operation such that customers of the provider network 100 may request the operation.

In some embodiments, at circle "5" in FIG. 1, the action orchestration service 118 executes the custom API action using a recipe execution 122 component. The recipe execution 122 component may also be referred to as a runtime component and tasks performed by the recipe execution 122 component in the processing of a request 134 may be referred to as taking place at runtime. In some embodiments, the API invocation request 134 is sent to the action orchestration service 118 via one or more networks 110 as discussed above. For example, a request 134 may be received by a component of the provider network 100 in the form of a uniform resource locator (URL) sent by a web browser. The request 134 may be received from the customer and forwarded to the recipe execution 122 component by one or more other components associated with the provider network 100, for example, one or more servers of a routing service 136 of the hardware virtualization service 102.

In some embodiments, a sheet 138 of data is used during the processing of a given request 134. As indicated above, a "sheet" is a data structure that includes fields of data that can be filled by agents of a recipe. The sheet 138 may thus represent the progress of the request 134. In some embodiments, the data associated with a sheet 138 is ephemeral and may be discarded after the processing of the request is complete. The action orchestration service 118 may store (temporarily, in memory) the sheet 138 representing the customer's request and its progress and may further allow for annotation of request metadata (for example, properties, resource identifiers, capacity instructions, placement data, and so on) that independent services may use in order to fulfill their portion of a request. As the request 134 is processed, agents may cause additional fields to be written to the sheet. The recipe execution 122 component may provide an abstract data access and update API so that called services can modify sheets. In one embodiment, default metadata may be added to a sheet such as encrypted fabric-attached storage, user-agent, credential store properties, source IPs, API version, endpoints, request-id, and so on.

When the request 134 for the operation is received, a compiled recipe 126 associated with the requested operation is selected by the recipe execution 122 component. In some embodiments, two or more recipes associated with the same request may be deployed simultaneously, and a selection of one of the recipes may be performed at runtime when a request is received. Different recipes may be linked to different customers, different regions, different compute environments (for example, a production environment compared to a test environment), and so on. In some embodiments, the recipe 126 may be selected based at least in part on the identity of the customer, based at least in part on one or more traits of the customer and/or request 134 (such as the geographical location of the customer), based at least in part on a recipe identifier specified with the request 134 (for example, as a parameter in a uniform resource locator (URL) representing the request).

In some embodiments, an execution order in which the agents of a selected recipe 126 are invoked is determined at runtime. An agent in the graph 128 may be invoked, for example, only when its one or more inputs are ready, and so the order in which the graph is traversed may vary from request to request, dependent on the order in which services generate fields of data that are consumed by other services. Agents may cause fields of data in a sheet to be filled (for example, by the service operations invoked by each agent), and the sheet may be discarded after the request processing is complete.

In one embodiment, some agents may delay an associated service call until a predetermined duration of time has passed since another service call was made. The delays may be implemented at runtime. In one embodiment, a delay in a service call may be made to mitigate the chances of doing unnecessary work if another service call fails. In one embodiment, a delay in a service call may be made so that the outputs of two or more service operations are generated closer in time to one another. In one embodiment, metrics concerning service response times may be used to implement the delays. In one embodiment, metrics concerning service failure rates may be used to implement the delays. In many circumstances, services that fail tend to fail rapidly, so service call delays may need only exceed the typical duration of such a failed call in order to prevent unnecessary calls to other services. The metrics used to implement service call delays may be maintained globally in the action orchestration service 118 (for example, using an external repository) or may instead be local to each instance that implements recipe execution 122 component.

In one embodiment, the recipe execution 122 component may support idempotency such that repeated requests with the same input do not generate different results. To implement idempotency, the recipe execution 122 component may re-drive calls to services until they succeed. If a call fails or no more forward progress is being made, the recipe execution 122 component may mark a sheet as failed (for example, with an error code such as "server-unavailable") and respond accordingly to the customer. In some embodiments, the recipe execution 122 component supports rollback of failed requests, for example, using checkpointing of some fields within a sheet. In one embodiment, a rollback agent may persist rollback documents and then inject those rollback documents as new sheets after some time interval.

As shown at circle "6" in FIG. 1, the recipe execution 122 component may invoke various other services based on traversal of the graph 128 during the processing of the request 134. As shown in FIG. 1, the services may include various types of services implemented by one or more compute instances 114A-114N, by other services 106 of the provider network, or by custom functions created by users and managed by an on-demand code execution service 104. In these examples and others, the services may represent endpoints that can be contacted by the recipe execution 122 component to invoke operations offered by the respective services. In some embodiments, the services may be accessible via load balancers.

As indicated above, in some circumstances, the sheet 138 may be held in memory on a temporary basis and may be discarded shortly after the processing of the request has completed. In other circumstances, the sheet 138 may be transferred to persistent storage for later review and analysis. If the execution of the operation failed, then the sheet 138 (including any fields generated throughout the processing of the corresponding request) may be made available to a suitable developer. The sheet 138 (or portions thereof) may be sent to the developer, or the developer may be granted access to the sheet in a management console associated with the action orchestration service 118 or provider network 100. Using the sheet 138, a customer associated with an action recipe may perform debugging or failure analysis of the failed execution. For example, the customer may use the contents of fields in the sheet to ascertain that one or more service calls failed to produce output in the sheet, that the recipe itself was improperly constructed, that the execution was halted by a network failure, and so on. The customer may, for example, then modify the recipe based on such analysis.

Figure 5:
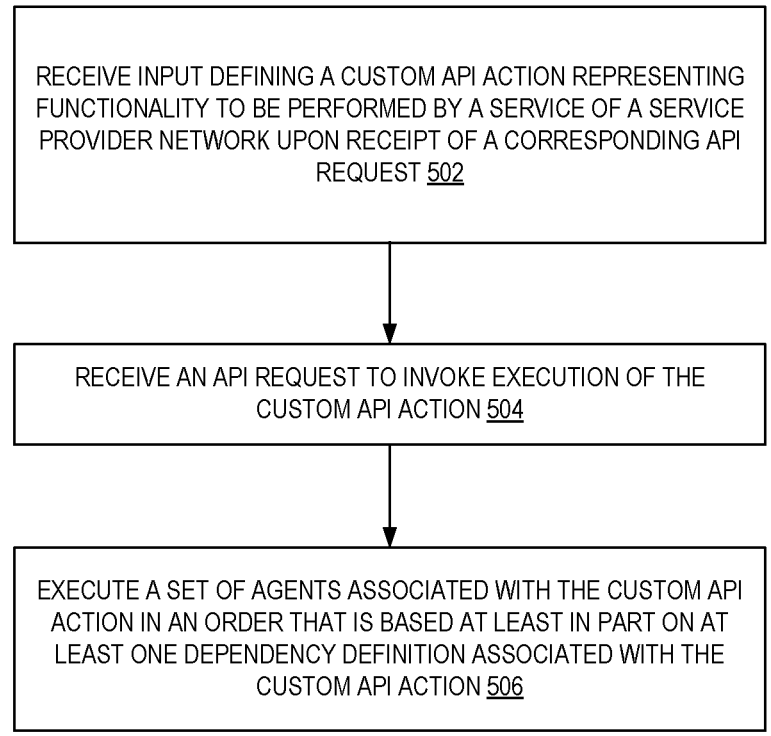
FIG. 5 is a flow diagram illustrating operations of a method for enabling customers of a service provider network to create and modify custom API actions according to some embodiments.

FIG. 5 is a flow diagram illustrating operations 500 of a method for enabling customers of a service provider network to create and modify custom API actions according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by an action orchestration service 118, hardware virtualization service 102, on-demand code execution service 104, and other services 106 of the other figures.

The operations 500 include, at block 502, receiving input defining a custom API action representing functionality to be performed by a service of a service provider network upon receipt of a corresponding API request. In some embodiments, the input originates from a user using a computing device outside of the service provider network. In some embodiments, the input identifies: a set of agents each representing executable logic used to perform a portion of the functionality, and at least one dependency definition indicating a data dependency between two or more agents of the set of agents.

In some embodiments, the operations further include causing display of a GUI including a visual representation of the set of agents and at least one dependency definition indicating a data dependency between two or more agents of the set of agents, wherein the visual representation includes a directed acyclic graph including nodes representing the set of agents and edges representing the at least one dependency definition, and wherein the input defining the custom API action is received via the GUI.

In some embodiments, executable logic associated with an agent of the set of agents is implemented at least in part by a function managed by an on-demand code execution service of the service provider network.

In some embodiments, the input further includes an action name identifying the custom API action, wherein the request to invoke execution of the custom API action identifies the custom API action using the action name.

In some embodiments, the operations further include causing display of a GUI including a list of agents, wherein the input defining the custom API action is received via the GUI and is expressed using an API action definition language.

The operations 500 further include, at block 504, receiving an API request to invoke execution of the custom API action.

The operations 500 further include, at block 506, executing a set of agents associated with the custom API action in an order that is based at least in part on at least one dependency definition associated with the custom API action.

Figure 6:
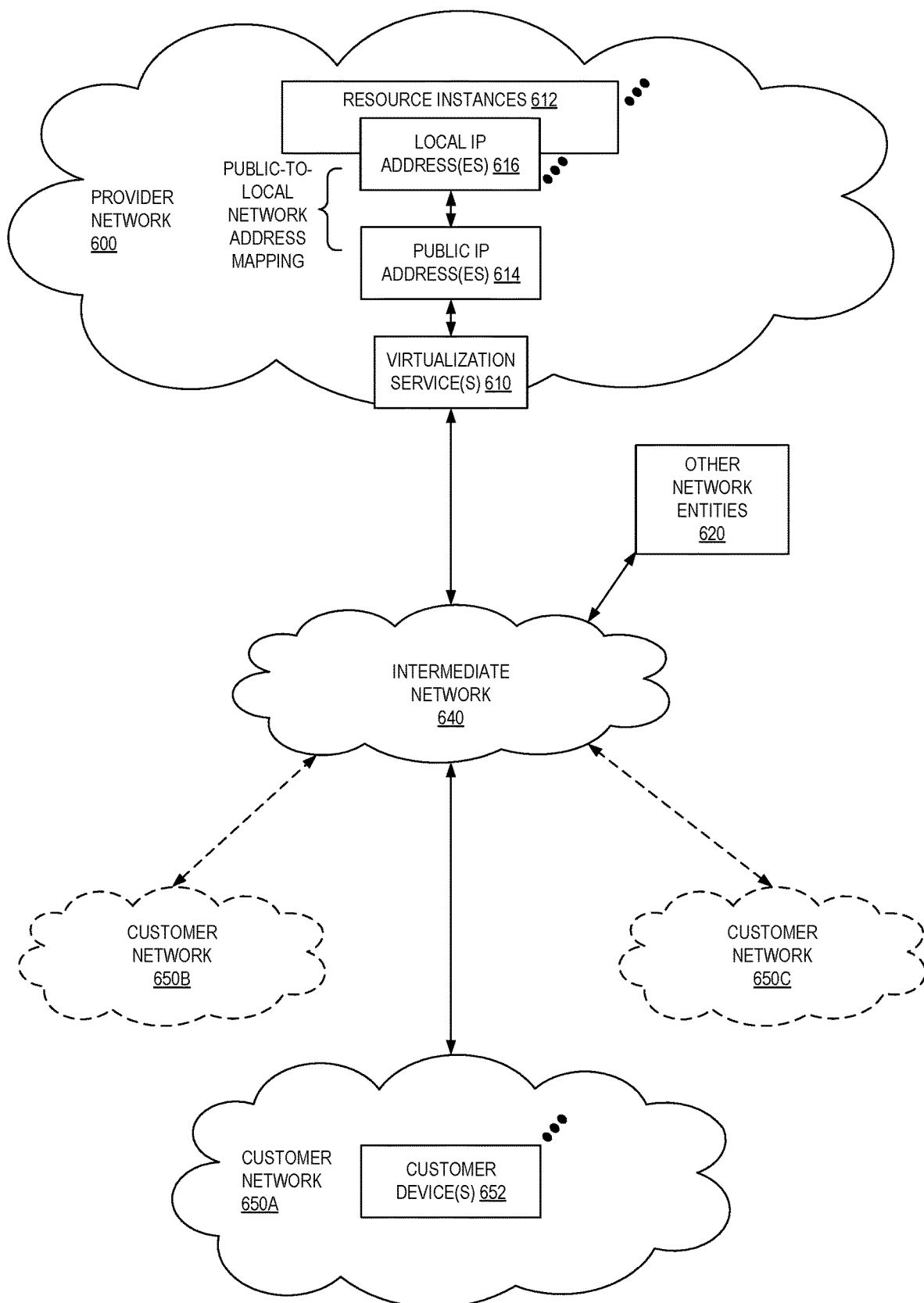
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (for example, Internet Protocol version 4 (IPv4) or Internet Protocol version 6 (IPv6) addresses) that customers may obtain from the provider network 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
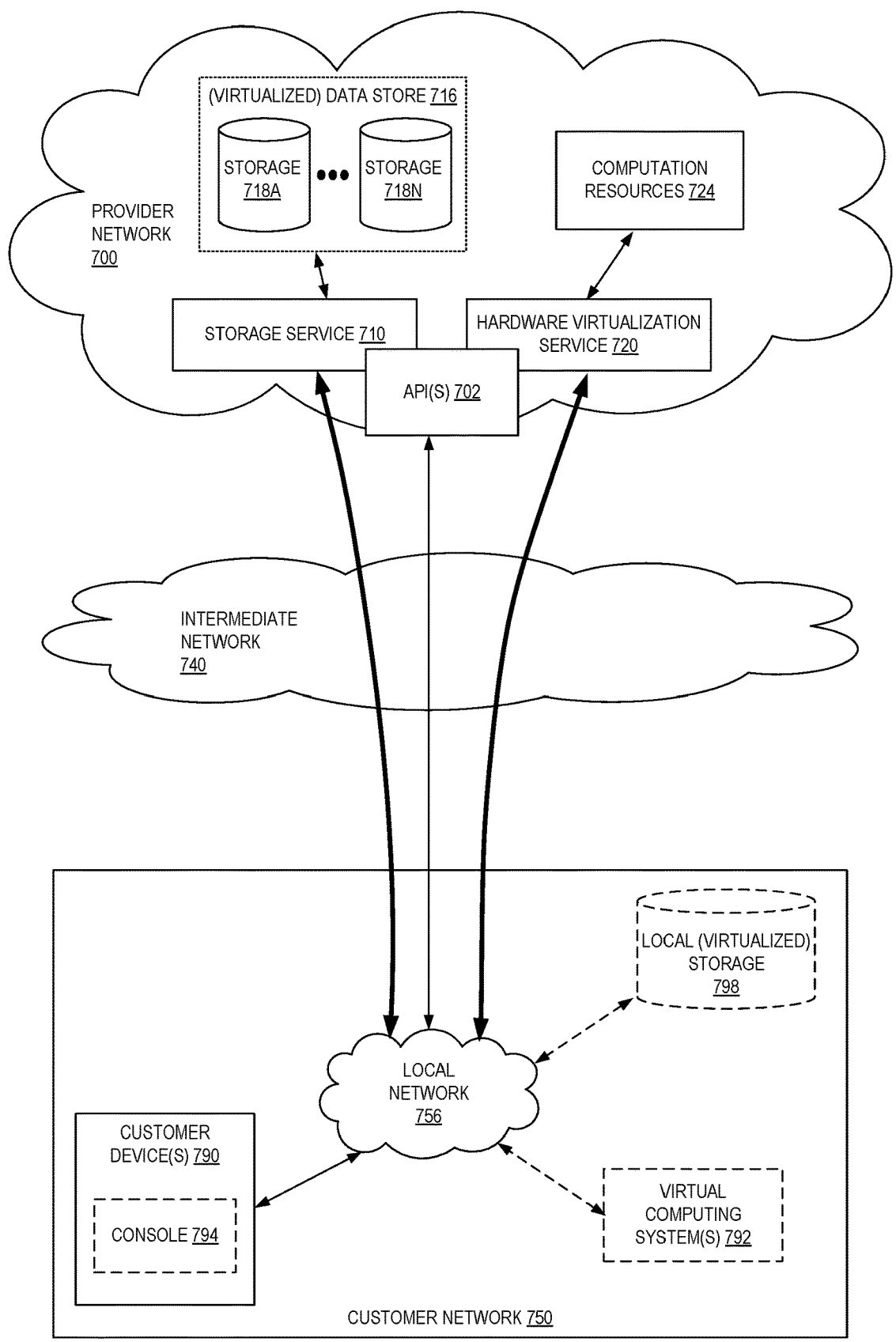
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
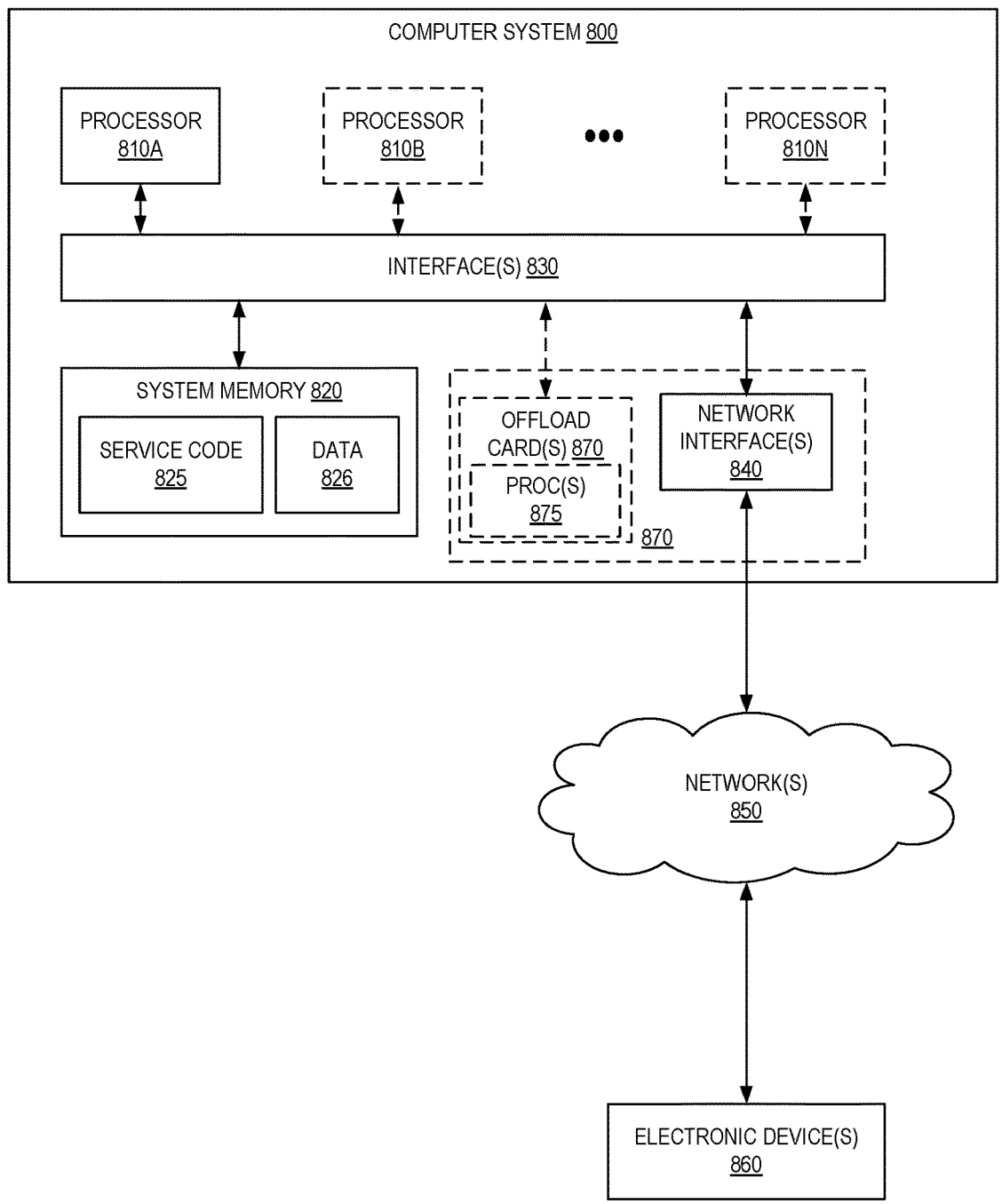
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as service code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, by a service of a service provider network, input defining a custom application programming interface (API) action representing functionality to be performed by the service upon receipt of a corresponding API request, the input originating from a user using a computing device outside of the service provider network, and the input identifying:
a set of agents, wherein an agent of the set of agents represents a callable function implemented by the service provider network, and wherein the agent is used to perform a portion of the functionality of the custom API action, and
at least one dependency definition indicating a data dependency between two or more agents of the set of agents;
receiving an API request to invoke execution of the custom API action; and
executing the set of agents in an order that is based at least in part on the at least one dependency definition.

2. The computer-implemented method of claim 1, further comprising causing display of a graphical user interface (GUI) including a visual representation of the set of agents and the at least one dependency definition, wherein the visual representation includes a directed acyclic graph including nodes representing the set of agents and edges representing the at least one dependency definition, and wherein the input defining the custom API action is received via the GUI.

3. The computer-implemented method of claim 1, wherein the agent is a first agent of the set of agents, and wherein a second agent of the set of agents is implemented using an on-demand code execution service of the service provider network.

4. A computer-implemented method comprising:
receiving, by a service of a service provider network, input defining a custom application programming interface (API) action representing functionality to be performed by the service upon request, wherein the input originates from a computing device outside of the service provider network and includes identification of a set of agents that implement the functionality, and wherein an agent of the set of agents represents a callable function implemented by the service provider network, and wherein the agent is used to perform a portion of the functionality of the custom API action;
receiving a request to invoke execution of the custom API action; and
executing the custom API action using the set of agents.

5. The computer-implemented method of claim 4, further comprising causing display of a graphical user interface (GUI) including a visual representation of the set of agents and at least one dependency definition indicating a data dependency between two or more agents of the set of agents, wherein the visual representation includes a directed acyclic graph including nodes representing the set of agents and edges representing the at least one dependency definition, and wherein the input defining the custom API action is received via the GUI.

6. The computer-implemented method of claim 4, wherein the agent is a first agent of the set of agents, and wherein a second agent of the set of agents is implemented using an on-demand code execution service of the service provider network.

7. The computer-implemented method of claim 4, wherein the input further includes an action name identifying the custom API action, and wherein the request to invoke execution of the custom API action identifies the custom API action using the action name.

8. The computer-implemented method of claim 4, wherein the input further includes at least one dependency definition indicating a data dependency between two or more agents of the set of agents, and wherein executing the custom API action includes executing the set of agents in an order that is based at least in part on the at least one dependency definition.

9. The computer-implemented method of claim 4, further comprising causing display of a graphical user interface (GUI) including a list of agents, and wherein the input defining the custom API action is received via the GUI and is expressed using an API action definition language.

10. The computer-implemented method of claim 4, further comprising compiling, by an action orchestration service, the input into an executable graph of agents implementing the custom API action, wherein the action orchestration service causes the graph of agents to be executed upon receipt of the custom API action.

11. The computer-implemented method of claim 4, wherein the input defining the custom API action adds functionality to an existing API action supported by the service of the service provider network.

12. The computer-implemented method of claim 4, wherein the input defining the custom API action removes functionality from an existing API action supported by the service of the service provider network.

13. The computer-implemented method of claim 4, wherein execution of the set of agents includes storing field data into a data structure, and wherein at least a portion of the field data stored in the data structure is used as input to at least one agent of the set of agents.

14. The computer-implemented method of claim 4, further comprising:
receiving a request to add the custom API action to a public listing service, the public listing service used to share custom API actions and custom agents among customers of the service provider network; and
causing display of information related to the custom API action to a customer of the service provider network.

15. The computer-implemented method of claim 4, further comprising:
receiving a request to add an agent of the set of agents to a public listing service, the agent representing a custom agent created by a first customer of the service provider network, and the public listing service used to share custom API actions and custom agents among customers of the service provider network; and
causing display of information related to the custom agent to a second customer of the provider network.

16. A system comprising:
an action orchestration service implemented by a first one or more electronic devices, the action orchestration service including instructions that upon execution cause the action orchestration service to:
receive input defining a custom application programming interface (API) representing functionality to be performed by the action orchestration service upon receipt of a corresponding API request, the input including identification of a set of agents that implement the functionality, the set of agents including at least one custom agent implemented by an on-demand code execution service, receive a request to invoke execution of the custom API, and execute the custom API using the set of agents including sending a service call to the on-demand code execution service corresponding to the at least one custom agent; and the on-demand code execution service implemented by a second one or more electronic devices, the on-demand code execution service including instructions that upon execution cause the on-demand code execution service to:

receive the service call from the action orchestration service, execute code associated with the service call, and send one or more field values to the action orchestration service.

17. The system of claim 16, wherein the action orchestration service includes further instructions that upon execution cause the action orchestration service to cause display of a graphical user interface (GUI) including a visual representation of the set of agents and at least one dependency definition indicating a data dependency between two or more agents of the set of agents, wherein the visual representation includes a directed acyclic graph including nodes representing the set of agents and edges representing the at least one dependency definition, and wherein the input defining the custom API is received via the GUI.

18. The system of claim 16, wherein the input further includes at least one dependency definition indicating a data dependency between two or more agents of the set of agents, and wherein executing the custom API includes executing the set of agents in an order that is based at least in part on the at least one dependency definition.

19. The system of claim 16, wherein the action orchestration service includes further instructions that upon execution cause the action orchestration service to cause display of a graphical user interface (GUI) including a list of agents, and wherein the input defining the custom API is received via the GUI and is expressed using an API definition language.

20. The system of claim 16, wherein the action orchestration service includes further instructions that upon execution cause the action orchestration service to compile the input into an executable graph of agents implementing the custom API, wherein the action orchestration service causes the graph of agents to be executed upon receipt of the custom API.

* * * * *